(12) United States Patent
Kim (10) Patent No.: US 9,994,148 B1
(45) Date of Patent: Jun. 12, 2018

(54) PEDESTRIAN WARNING DEVICE OF VEHICLE

(71) Applicant: Mando-Hella Electronics Corporation, Gyeonggi-do (KR)

(72) Inventor: Ki-Man Kim, Gyeonggi-do (KR)

(73) Assignee: MANDO HELLA ELECTRONICS CORPORATION, Gyeonggi-Do (KR)

( * ) Notice: Subject to any disclaimer, the term of this patent is extended or adjusted under 35 U.S.C. 154(b) by 0 days. days.

(21) Appl. No.: 15/648,450

(22) Filed: Jul. 12, 2017

(30) Foreign Application Priority Data

Dec. 14, 2016 (KR) .................. 10-2016-0170051

(51) Int. Cl.
*G08G 1/16* (2006.01)
*B60Q 5/00* (2006.01)

(52) U.S. Cl.
CPC ............ *B60Q 5/006* (2013.01); *G08G 1/166* (2013.01)

(58) Field of Classification Search
CPC .... G08G 1/166; G08G 1/09623; G01C 21/26; G01S 13/42; G01S 13/867
See application file for complete search history.

(56) References Cited

U.S. PATENT DOCUMENTS

| | | | | |
|---|---|---|---|---|
| 5,059,796 A * | 10/1991 | Nakamura | ............ | G08B 13/194 250/330 |
| 6,327,536 B1 * | 12/2001 | Tsuji | ............ | B60Q 9/008 340/435 |
| 8,537,030 B2 | 9/2013 | Perkins | | |
| 9,096,165 B2 * | 8/2015 | Grosse-Budde | ....... | B60Q 5/008 |
| 9,126,524 B2 * | 9/2015 | Fulton | ............ | B60Q 5/00 |
| 9,266,470 B2 * | 2/2016 | Kanaya | ............ | H03G 7/00 |
| 9,613,606 B2 * | 4/2017 | Feldhaus | ............ | G10H 1/0091 |
| 2006/0115118 A1 * | 6/2006 | Nagaoka | ............ | G06K 9/00362 382/104 |
| 2006/0115119 A1 * | 6/2006 | Nagaoka | ............ | B60Q 1/525 382/104 |

(Continued)

FOREIGN PATENT DOCUMENTS

| | | | | |
|---|---|---|---|---|
| EP | 1564703 A1 * | 8/2005 | ............ | B60W 30/16 |
| JP | 3625073 | 12/2004 | | |

(Continued)

*Primary Examiner* — Fekadeselassie Girma
(74) *Attorney, Agent, or Firm* — Ladas & Parry, LLP (57) ABSTRACT

A pedestrian warning device of a vehicle is disclosed. The pedestrian warning device includes a pedestrian detector configured to detect a position of a pedestrian walking around a vehicle, an in-vehicle warning sound outputter configured to output warning sounds through a plurality of internal speakers arranged at different positions in the vehicle, and a controller configured to generate pedestrian movement information including a movement direction of the pedestrian based on the detected position of the pedestrian, determine a moved position of the pedestrian based on the generated pedestrian movement information, control an operation of the in-vehicle warning sound outputter according to the determined moved position to operate an internal speaker corresponding to the moved position of the pedestrian among the plurality of internal speakers as the pedestrian moves, and notify a driver of the moved position of the pedestrian by change of a direction of the output warning sound.

7 Claims, 10 Drawing Sheets

(56) References Cited

U.S. PATENT DOCUMENTS

| | | | | |
|---|---|---|---|---|
| 2006/0126897 A1* | 6/2006 | Nagaoka | ............... | B60Q 9/008 382/103 |
| 2006/0126899 A1* | 6/2006 | Nagaoka | ............... | B60K 35/00 382/103 |
| 2006/0139451 A1* | 6/2006 | Yoneno | ............... | H04N 5/4403 348/114 |
| 2007/0229238 A1* | 10/2007 | Boyles | ............... | G06K 9/00369 340/435 |
| 2007/0255568 A1* | 11/2007 | Pennock | ............... | H04S 7/30 704/270 |
| 2008/0166024 A1* | 7/2008 | Iketani | ............... | B60R 1/00 382/107 |
| 2008/0199050 A1* | 8/2008 | Koitabashi | ............... | B60R 1/00 382/107 |
| 2009/0066499 A1* | 3/2009 | Bai | ............... | G10K 15/02 340/459 |
| 2009/0189753 A1* | 7/2009 | Enya | ............... | G02B 27/01 340/435 |
| 2009/0198418 A1* | 8/2009 | Itoga | ............... | B60R 21/0136 701/46 |
| 2009/0322566 A1* | 12/2009 | Shirakawa | ............... | G01C 21/20 340/944 |
| 2010/0245069 A1* | 9/2010 | Noro | ............... | B60Q 5/008 340/441 |
| 2011/0199199 A1* | 8/2011 | Perkins | ............... | B60Q 1/506 340/435 |
| 2011/0261970 A1* | 10/2011 | Hamelink | ............... | G10K 15/02 381/71.4 |
| 2012/0166042 A1* | 6/2012 | Kokido | ............... | B60Q 5/008 701/36 |
| 2012/0290184 A1* | 11/2012 | Suzuki | ............... | G01S 13/931 701/93 |
| 2012/0327236 A1* | 12/2012 | Kiyohara | ............... | G06K 9/00369 348/148 |
| 2013/0010980 A1* | 1/2013 | Yoshioka | ............... | G01S 3/802 381/92 |
| 2013/0030686 A1* | 1/2013 | Morotomi | ............... | G08G 1/167 701/301 |
| 2013/0032717 A1* | 2/2013 | Saito | ............... | G01J 5/0225 250/338.1 |
| 2013/0056637 A1* | 3/2013 | Miyashita | ............... | G01J 5/024 250/338.3 |
| 2013/0070098 A1* | 3/2013 | Aimura | ............... | G08G 1/166 348/148 |
| 2013/0100281 A1* | 4/2013 | Sharma | ............... | G06K 9/6203 348/135 |
| 2013/0187793 A1* | 7/2013 | Katayama | ............... | G08G 1/09623 340/905 |
| 2013/0210460 A1* | 8/2013 | Subramanian | ............... | B61L 15/0027 455/456.3 |
| 2013/0223643 A1* | 8/2013 | Sato | ............... | G08B 3/10 381/86 |
| 2013/0235201 A1* | 9/2013 | Kiyohara | ............... | G06K 9/00805 348/148 |
| 2013/0292955 A1* | 11/2013 | Higgins | ............... | B60Q 9/00 292/195 |
| 2014/0085113 A1* | 3/2014 | Bonhoure | ............... | B60K 35/00 340/932.2 |
| 2014/0092249 A1* | 4/2014 | Freiburger | ............... | H04N 7/181 348/148 |
| 2014/0168431 A1* | 6/2014 | Goto | ............... | G06K 9/00369 348/143 |
| 2015/0104041 A1* | 4/2015 | Kulavik | ............... | H04R 1/1041 381/107 |
| 2015/0160019 A1* | 6/2015 | Biswal | ............... | G01C 21/26 701/1 |
| 2015/0329043 A1* | 11/2015 | Skvarce | ............... | B60Q 9/008 340/435 |
| 2016/0202351 A1* | 7/2016 | Uotsu | ............... | G01S 13/04 342/27 |
| 2016/0205521 A1* | 7/2016 | Kim | ............... | B60K 37/02 701/36 |
| 2017/0217394 A1* | 8/2017 | Shima | ............... | B60R 21/0134 |
| 2017/0221500 A1* | 8/2017 | Glasgow | ............... | G10L 19/0204 |
| 2017/0262710 A1* | 9/2017 | Kozuka | ............... | B60Q 1/26 |
| 2017/0262715 A1* | 9/2017 | Kozuka | ............... | G06K 9/00805 |

FOREIGN PATENT DOCUMENTS

| | | |
|---|---|---|
| JP | 2006-44359 | 2/2006 |
| JP | 2007-320472 | 12/2007 |

* cited by examiner

12
PEDESTRIAN WARNING DEVICE OF VEHICLE

CROSS-REFERENCE TO RELATED APPLICATION(S)

This application claims the benefit of Korean Patent Application No. 2016-0170051, filed on Dec. 14, 2016 in the Korean Intellectual Property Office, the disclosure of which is incorporated herein by reference.

BACKGROUND

1. Field

The present invention relates to a pedestrian warning device of a vehicle, and more particularly to a pedestrian warning device of a vehicle that alerts a driver to a pedestrian around the vehicle.

2. Description of the Related Art

Generally, driving vehicles such as electric vehicles, fuel cell vehicles, hybrid vehicles, etc., which run on electric driving, have a quiet driving sound than engine vehicles. Therefore, it is difficult for pedestrians to recognize the approach of electric vehicles, fuel cell vehicles, and hybrid vehicles.

Therefore, there is a risk of accident between the vehicle and the pedestrian due to the pedestrian not noticing the vehicle.

Japanese Laid-Open Patent Publication No. 2006-044359 discloses a pedestrian notification device for a vehicle that detects pedestrians around the vehicle and alerts a driver.

However, at present, only the existence of the pedestrian is notified to the driver with a warning sound and the moving direction of the pedestrian cannot be notified to the driver.

Therefore, at present, the safety of pedestrians cannot be secured sufficiently, and there is still a risk of an accident between the vehicle and the pedestrian.

PRIOR ART DOCUMENT

Patent Literature (Patent Document 1) Japanese Laid-Open Patent Publication No. 2006-044359

SUMMARY

Therefore, it is an aspect of the present invention is to provide a pedestrian warning device of a vehicle that notifies a driver of a moved position of a pedestrian by using the direction of a warning sound outputted from internal speakers that output warning sounds to the inside of a vehicle.

It is another aspect of the present invention to provide a pedestrian warning device of a vehicle that notifies a driver of a moved position of a pedestrian by using the direction of a warning sound outputted from internal speakers outputting warning sounds to the inside of a vehicle, and notifies a pedestrian of the position of the vehicle by using the direction of a warning sound outputted from external speakers that output warning sounds to the outside of the vehicle.

Additional aspects of the invention will be set forth in part in the description which follows and, in part, will be obvious from the description, or may be learned by practice of the invention.

In accordance with one aspect of the present disclosure, a pedestrian warning device of a vehicle includes: a pedestrian detector configured to detect a position of a pedestrian walking around a vehicle; an in-vehicle warning sound outputter configured to output warning sounds through a plurality of internal speakers arranged at different positions in the vehicle; and a controller configured to generate pedestrian movement information including a movement direction of the pedestrian based on the detected position of the pedestrian, determine a moved position of the pedestrian based on the generated pedestrian movement information, control an operation of the in-vehicle warning sound outputter according to the determined moved position to operate an internal speaker corresponding to the moved position of the pedestrian among the plurality of internal speakers as the pedestrian moves, and notify a driver of the moved position of the pedestrian by change of a direction of the output warning sound.

Further, the pedestrian warning device may include an out-vehicle warning sound outputter configured to output warning sounds through a plurality of external speakers oriented to various directions of the outside of the vehicle, and the controller may include operating an external speaker corresponding to the moved position of the pedestrian among the plurality of external speakers according to the determined moved position and notifying the pedestrian of a position of the vehicle by change of a direction of the output warning sound.

Further, the controller may notify the pedestrian of the position of the vehicle by change of a volume of the output warning sound when operating the external speaker corresponding to the moved position of the pedestrian among the plurality of external speakers as the pedestrian moves.

Further, the controller may notify the driver of the moved position of the pedestrian by change of a volume of the output warning sound when operating the internal speaker corresponding to the moved position of the pedestrian among the plurality of internal speakers as the pedestrian moves.

Further, the controller may control the volume of the output warning sound according to a distance between the pedestrian and the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. The drawings and description are to be regarded as illustrative in nature and not restrictive, and like reference numerals designate like elements throughout the specification.

Figure 1:
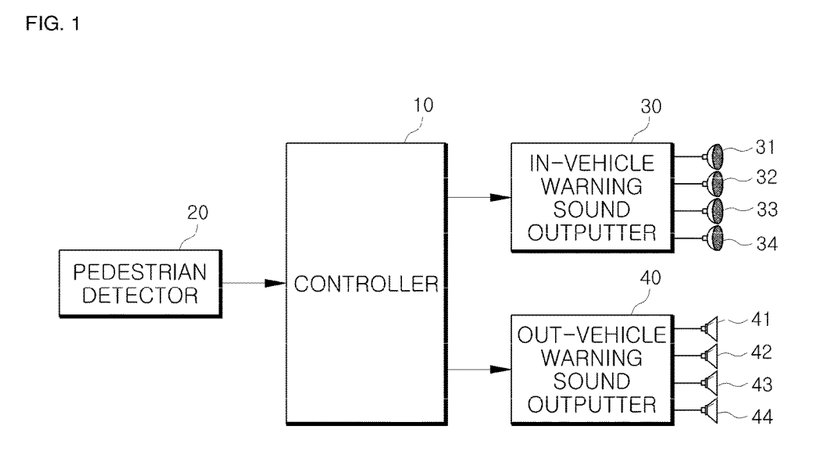
FIG. 1 is a control block diagram of a pedestrian warning device of a vehicle according to an embodiment of the present invention.

FIG. 1 is a control block diagram of a pedestrian warning device of a vehicle according to an embodiment of the present invention.

Referring to FIG. 1, a pedestrian warning device of a vehicle includes a controller 10 that performs overall control.

A pedestrian detector 20 is electrically connected to an input side of the controller 10.

An in-vehicle warning sound outputter 30 and an out-vehicle warning sound outputter 40 are electrically connected to an output side of the controller 10.

The pedestrian detector 20 may detect a pedestrian walking around the vehicle. For example, the pedestrian detector 20 may include laser sensors, millimeter-wave radars, or stereo cameras having image sensors.

The pedestrian detector 20 may be provided at a plurality of positions on the front, rear, left, and right sides of the vehicle so as to detect pedestrians located in various directions around the vehicle when the pedestrian detection is possible only in any one of the front, rear, left, and right sides of the vehicle.

The pedestrian detector 20 may be provided in the singular number when the pedestrian detector 20 using a stereo camera capable of 360-degree photographing is provided.

The pedestrian detector 20 detects a pedestrian around the vehicle and transmits information about the detected pedestrian (referred to as pedestrian information) to the controller 10. The controller 10 may recognize the direction and the position of the pedestrian based on the pedestrian information detected by the pedestrian detector 20.

The in-vehicle warning sound outputter 30 outputs a warning sound to the inside of the vehicle according to a control signal of the controller 10 so that the driver can recognize a moved position of the pedestrian based on the direction of the output warning sound. The in-vehicle warning sound outputter 30 may include a plurality of internal speakers provided at different positions in the vehicle and oriented to the inside of the vehicle. The in-vehicle warning sound outputter 30 may control the operation of each internal speaker and the volume of the warning sound outputted from each internal speaker. For reference, the number and the mounting position of the internal speakers may be changeable according to the type of vehicle or the necessity.

The out-vehicle warning sound outputter 40 outputs a warning sound to the outside of the vehicle according to a control signal of the controller 10 so that the pedestrian can recognize the position of the vehicle based on the direction of the output warning sound. The out-vehicle warning sound outputter 40 may include a plurality of external speakers oriented in various directions of the outside of the vehicle. The out-vehicle warning sound outputter 40 may control the operation of each external speaker and the volume of the warning sound outputted from each external speaker. For reference, the number and the mounting position of the external speakers may be changeable according to the type of vehicle or the necessity.

The controller 10 can generate pedestrian movement information including the movement direction of the pedestrian based on the position of the pedestrian detected through the pedestrian detector 20, determine a moved position of the pedestrian based on the generated pedestrian movement information, control the operation of the in-vehicle warning sound outputter 30 according to the determined moved position to operate an internal speaker corresponding to the moved position of the pedestrian among the plurality of internal speakers as the pedestrian moves, and notify the driver of the moved position of the pedestrian by using the direction of the output warning sound.

Further, the controller 10 may generate pedestrian movement information including the movement direction of the pedestrian based on the position of the pedestrian detected through the pedestrian detector 20, determine a moved position of the pedestrian based on the generated pedestrian movement information, control the operation of the out-vehicle warning sound outputter 40 according to the determined moved position to operate an external speaker corresponding to the moved position of the pedestrian among the plurality of external speakers as the pedestrian moves, and notify the pedestrian of the position of the vehicle by using the direction of the output warning sound.

Figure 2:
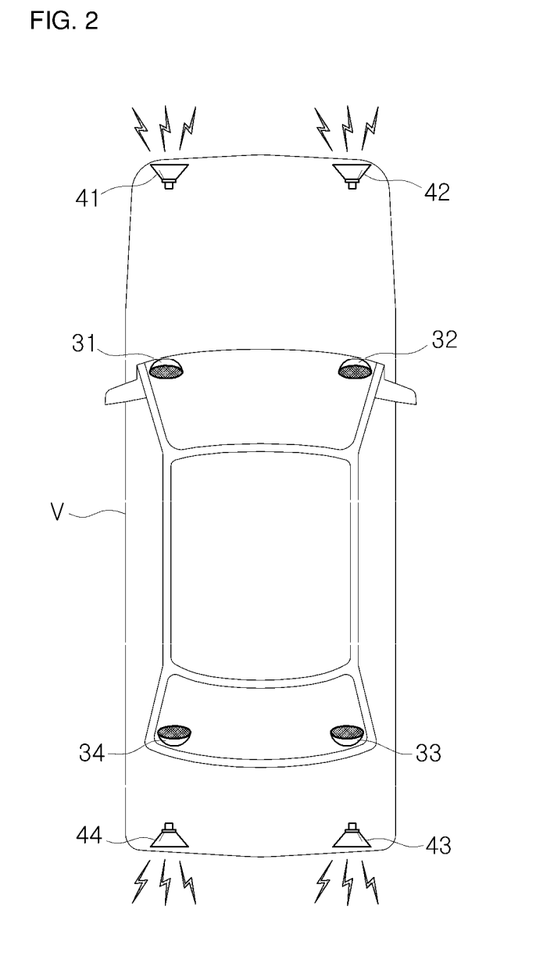
FIG. 2 is a view for illustrating an arrangement of internal speakers and external speakers of a pedestrian warning device of a vehicle according to an embodiment of the present invention.

FIG. 2 is a view for illustrating an arrangement of internal speakers and external speakers of a pedestrian warning device of a vehicle according to an embodiment of the present invention.

Referring to FIG. 2, the in-vehicle warning sound outputter 30 may include four internal speakers 31 to 34. For example, the four internal speakers 31 to 34 may be provided on respective corners of the inside of the vehicle. The four internal speakers 31 to 34 may be provided in front of a driver's seat, in front of an assistant's seat, in rear of a seat behind the driver's seat, and in rear of a seat behind the assistant seat, respectively. The internal speakers may be separately provided from the vehicle, or may be embedded in the vehicle.

The out-vehicle warning sound outputter 40 may include four external speakers 41 to 44. For example, the four external speakers 41 to 44 may be provided in the vicinity of each of two headlights in the front of the vehicle, and in the vicinity of each of two brake lamps in the rear of the vehicle, respectively.

Hereinafter, the operation of the pedestrian warning device of a vehicle having the above-described configuration will be described.

Figure 3:
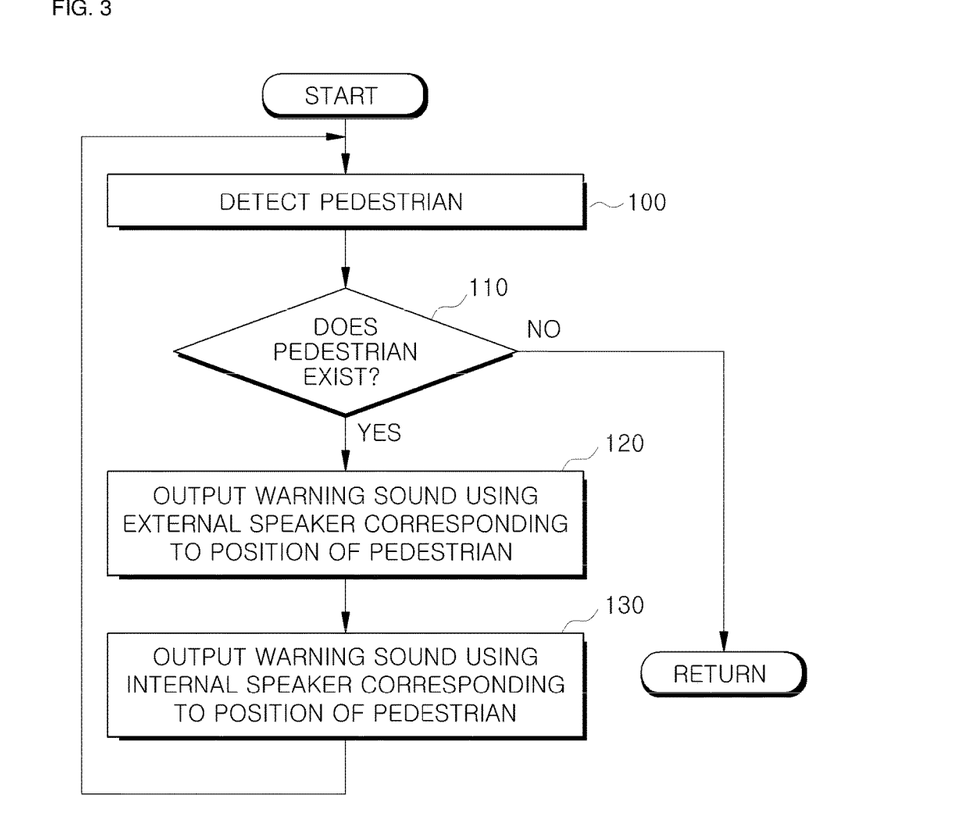
FIG. 3 is a control flowchart of a pedestrian warning device of a vehicle according to an embodiment of the present invention.

FIG. 3 is a control flowchart of a pedestrian warning device of a vehicle according to an embodiment of the present invention.

Referring to FIG. 3, the controller 10 detects pedestrian information around the vehicle through the pedestrian detector 20 (100).

After detecting the pedestrian information in the operation 100, the controller 10 analyzes the detected pedestrian information to determine whether there is a pedestrian walking around the vehicle (110).

If a pedestrian exists as a result of the determination in the operation 110, the controller 10 operates the external speaker corresponding to the position of the pedestrian through the out-vehicle warning sound outputter 40 to output a warning sound from the external speaker so as to notify the pedestrian of the position of the vehicle. (120). Therefore, the pedestrian can recognize the position of the vehicle based on the direction of the warning sound coming from the external speaker, so that the pedestrian can be pre-cautious the collision with the vehicle.

Then, the controller 10 operates the internal speaker corresponding to the position of the pedestrian through the in-vehicle warning sound outputter 30 to output a warning sound from the internal speaker so as to notify the driver of the moved position of the pedestrian (130). Therefore, the driver can recognize the moved position of the pedestrian based on the direction of the warning sound from the internal speaker, so that the collision between the vehicle and the pedestrian can be prevented in advance.

Figure 4:
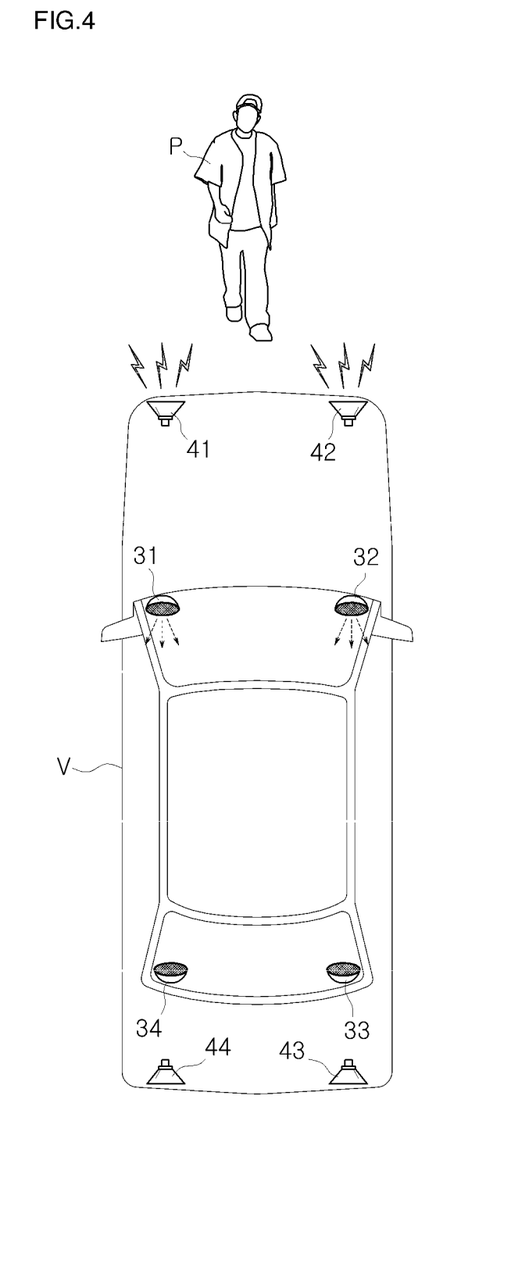
FIGS. 4 to 6 are views for illustrating change in the direction of a warning sound outputted for each pedestrian position when a pedestrian located in the front of the vehicle moves to the right side of the vehicle in a pedestrian warning device of a vehicle according to an embodiment of the present invention.
Figure 5:
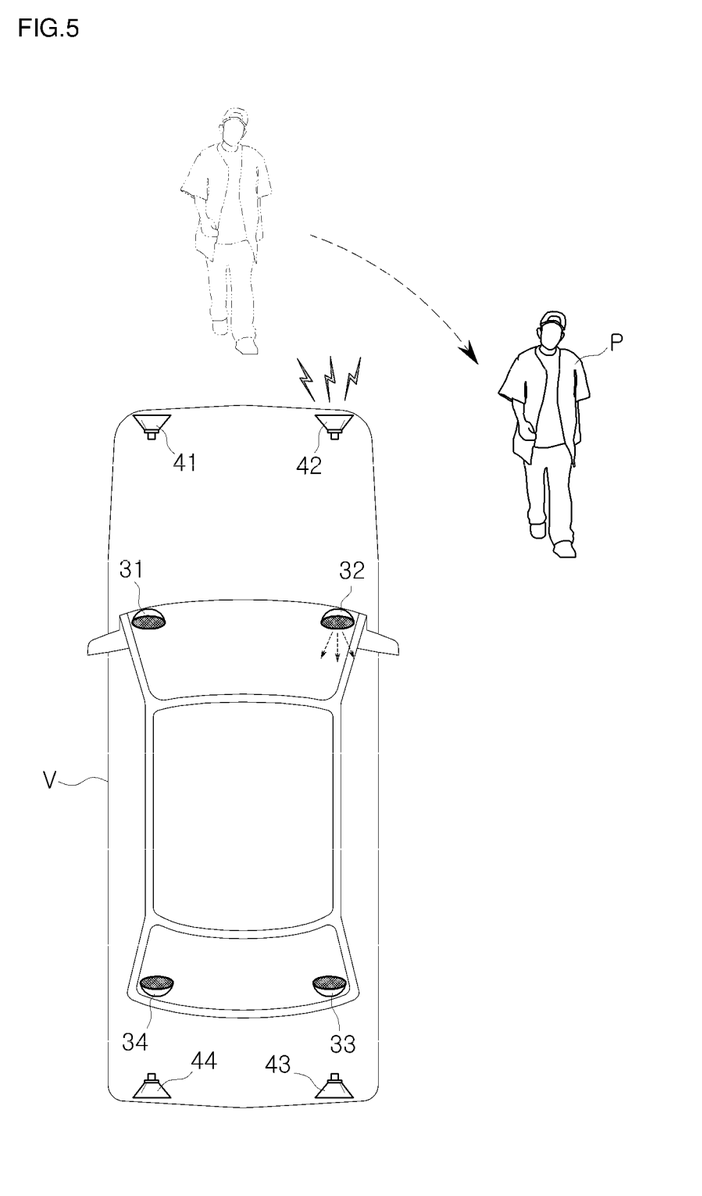
Figure 6:
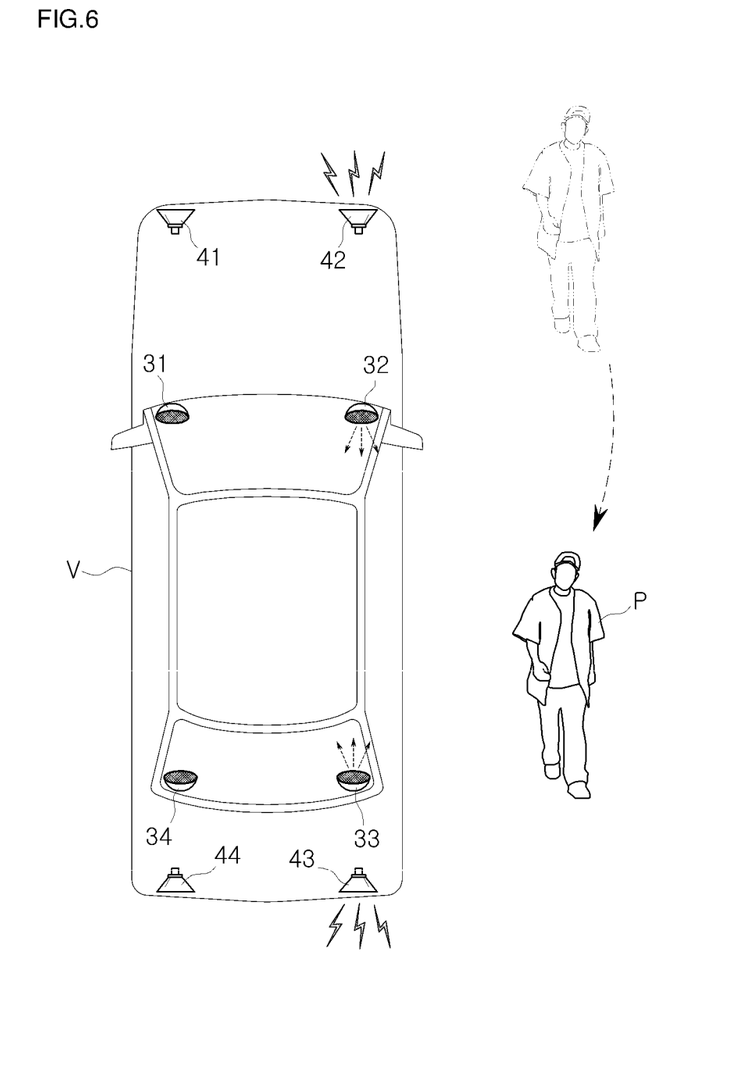

FIGS. 4 to 6 are views for illustrating changes in the direction of a warning sound outputted for each pedestrian position when a pedestrian located in the front of the vehicle moves to the right side of the vehicle in a pedestrian warning device of a vehicle according to an embodiment of the present invention.

As shown in FIG. 4, when a pedestrian P is located in front of a vehicle V, a first external speaker 41 and a second external speaker 42 mounted adjacent to the left and right headlights of the vehicle V among the four external speakers 41 to 44 are operated. Accordingly, the first external speaker 41 and the second external speaker 42 output warning sounds, so that the pedestrian P can identify the position of the vehicle V based on the direction of the output warning sounds.

Further, when the pedestrian P is located in front of the vehicle V, a first internal speaker 31 and a second internal speaker 32 mounted in front of the drivers seat and the assistant's sear among the four internal speakers 31 to 34 are operated. Accordingly, the first internal speaker 31 and the second internal speaker 32 output warning sounds, so that the driver can identify that the pedestrian exists in front of the vehicle V in the direction of the output alarm sound.

As shown in FIG. 5, when the pedestrian P moves from the front of the vehicle V to the front right side of the vehicle V, the first external speaker 41 in operation stops operating and only the second external speaker 42 in operation continuously outputs the warning sound. Accordingly, warning sound is not output from both the first external speaker 41 and the second external speaker 42, but output only from the second external speaker 42, so that the pedestrian P can identify the position of the vehicle V through the change of the warning sound.

Further, when the pedestrian P moves from the front of the vehicle V to the front right side of the vehicle V, the first internal speaker 31 in operation stops operating and only the second internal speaker 32 in operation continuously outputs the warning sound. Accordingly, the warning sound is not output from both the first internal speaker 31 and the second internal speaker 32, but is output only from the second internal speaker 32, so that the driver can identify that the pedestrian P has moved from the front of the vehicle to the front right side of the vehicle V through the change of the warning sound.

As shown in FIG. 6, when the pedestrian P moves from the front right side of the vehicle V to the right side of the vehicle V, the second external speaker 42 in operation continues to output the warning sound and a third external speaker 43 is additionally operated. Accordingly, the warning sound is output not only from the second external speaker 42, but also from the third external speaker 43, so that the pedestrian P can identify the position of the vehicle V through the change of the warning sound.

Further, when the pedestrian P moves from the front right side of the vehicle V to the right side of the vehicle V, the second internal speaker 32 in operation continues to output the warning sound and a third internal speaker 33 is additionally operated. Accordingly, the warning sound is output not only from the second internal speaker 32, but also from the third internal speaker 33, so that the driver can identify that the pedestrian P has moved from the front right side of the vehicle V to the right side of the vehicle V through the change of the warning sound.

Figure 7:
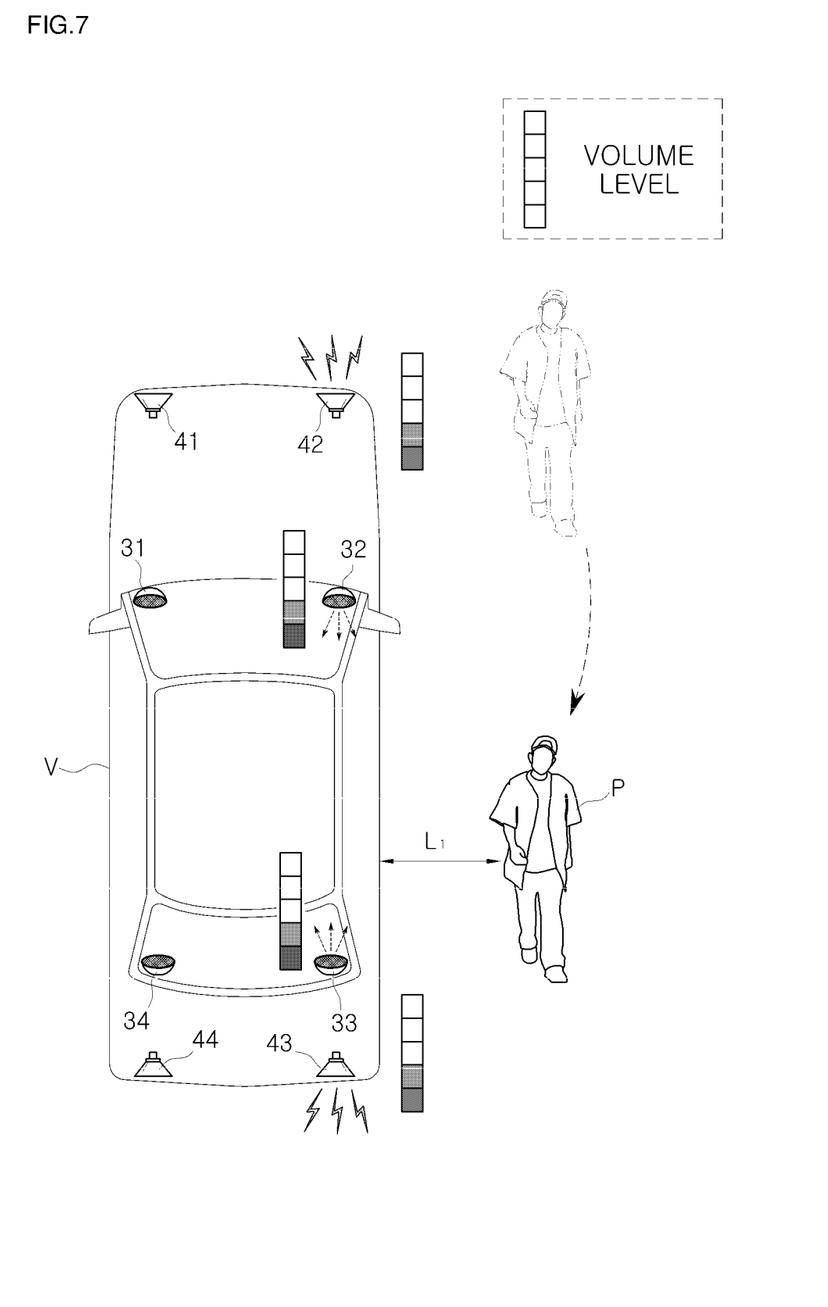
FIGS. 7 and 8 are views for illustrating change in the volume of a warning sound according to the distance between a vehicle and a pedestrian in the pedestrian warning device of a vehicle according to an embodiment of the present invention.
Figure 8:
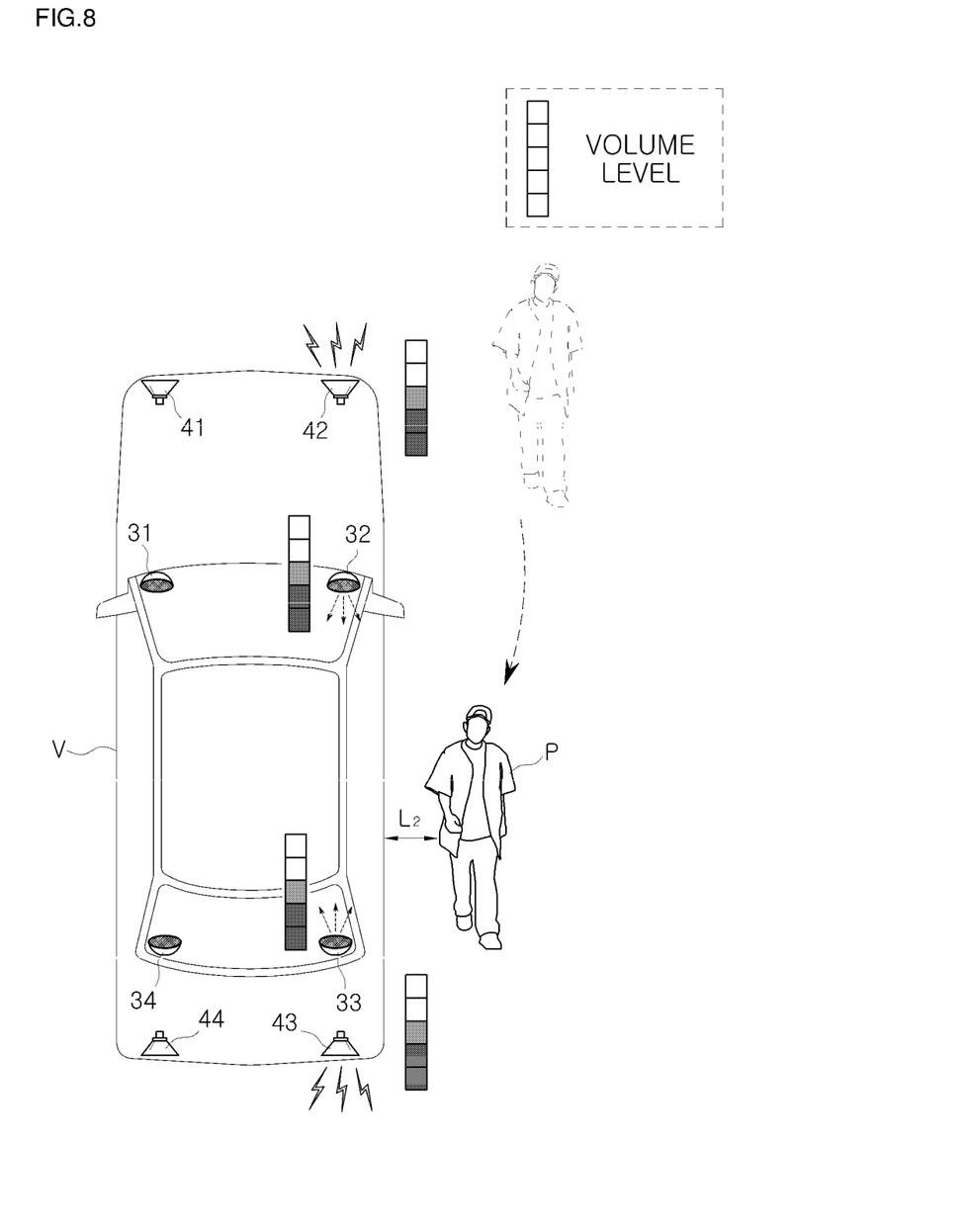

FIGS. 7 and 8 are views for illustrating changes in the volume of a warning sound according to the distance between a vehicle and a pedestrian in a pedestrian warning device of a vehicle according to an embodiment of the present invention.

Referring to FIGS. 7 and 8, when the pedestrian P moves from the front right side of the vehicle V to the right side of the vehicle V, the warning sounds are output using the external speaker and the internal speaker, respectively, and the volumes of the output warning sounds can be adjusted based on the distance between the pedestrian P and the vehicle V (L1, L2, L1>L2).

That is, as the distance between the vehicle V and the pedestrian P moved from the front right side of the vehicle V to the right side of the vehicle V decreases, the volume levels of the output warning sounds are raised such that a great volume of warning sound is provided to the driver and the pedestrian P. The pedestrian P and the driver can recognize the positions of the pedestrian and the vehicle more accurately by taking into consideration the change of the volume as well as the change of the direction of the warning sound.

Figure 9:
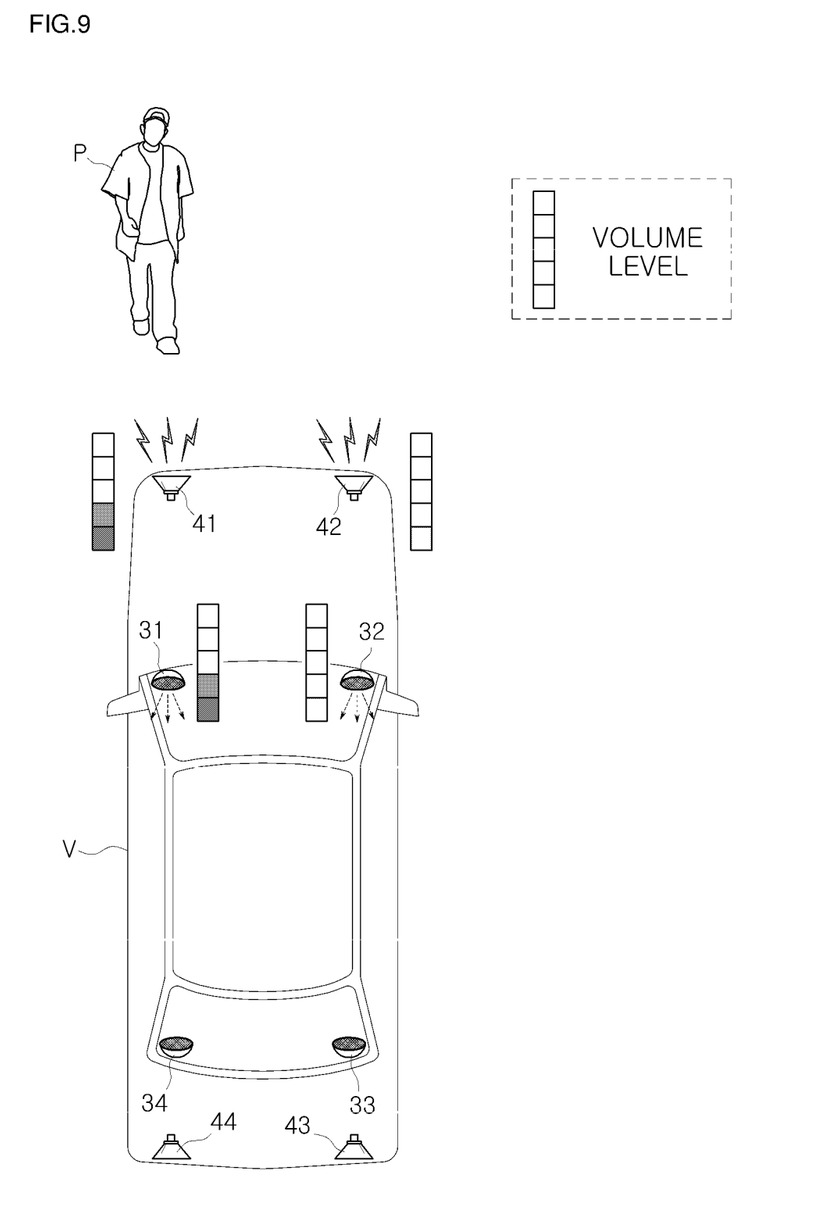
FIGS. 9 and 10 are views for illustrating changes in the direction and volume of a warning sound outputted for each pedestrian position when a pedestrian located at the front left side of the vehicle moves to the front right side of the vehicle in a pedestrian warning device of a vehicle according to an embodiment of the present invention.
Figure 10:
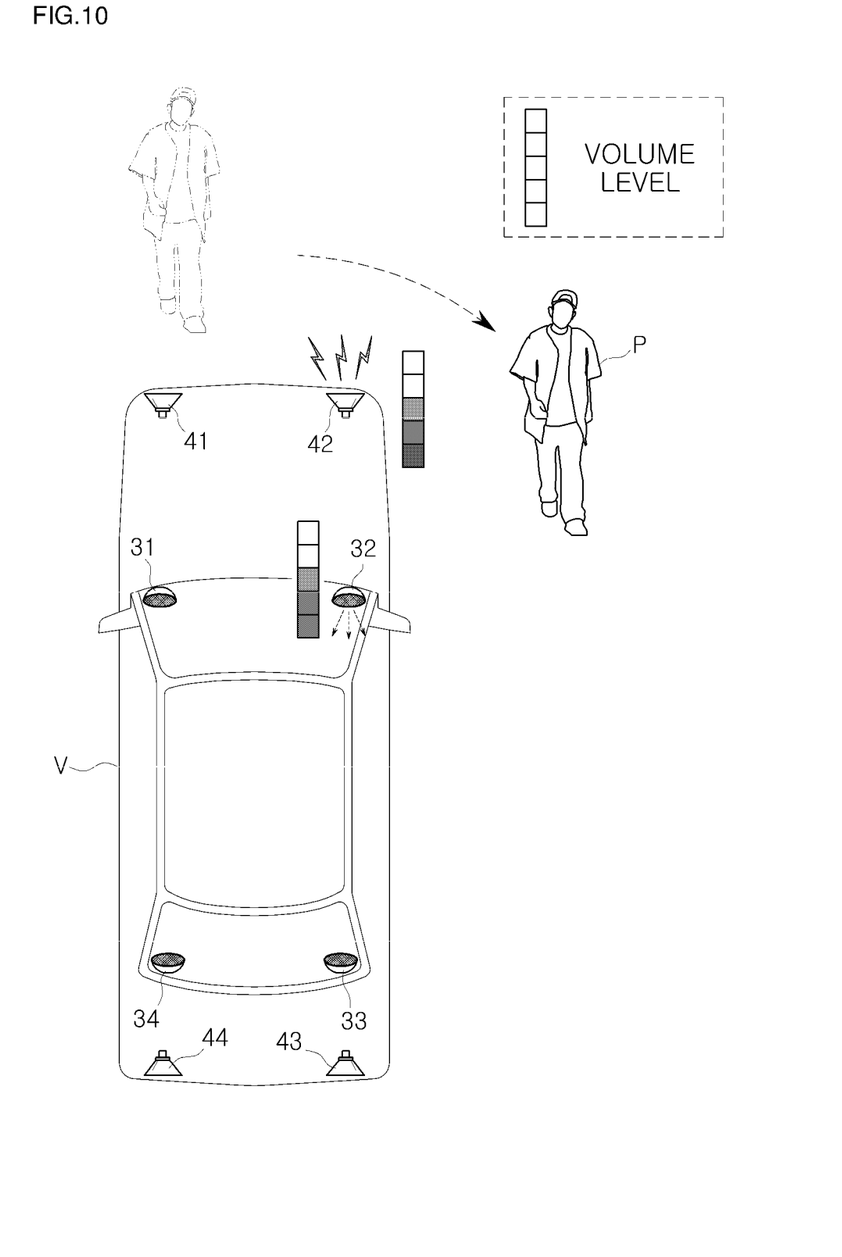

FIGS. 9 and 10 are views for illustrating changes in the direction and volume of a warning sound outputted for each pedestrian position when a pedestrian located at the front left side of the vehicle moves to the front right side of the vehicle in a pedestrian warning device of a vehicle according to an embodiment of the present invention.

Referring to FIGS. 9 and 10, when the pedestrian located on the front left side of the vehicle V moves to the front right side of the vehicle V, not only the positions of the pedestrian and the vehicle are recognized by the warning sounds outputted using the external speaker and the internal speaker, but also as the distance between the pedestrian and the vehicle gets closer according to the movement of the pedestrian, the volume of the warning sound is changed by increasing the volume of the warning sound so that the driver and the pedestrian can more accurately recognize the position of the pedestrian and the vehicle, respectively.

As is apparent from the above, the pedestrian warning device of a vehicle according to the embodiment of the present invention can prevent an accident between the vehicle and the pedestrian in advance by notifying the driver of the moved position of the pedestrian by changes of the direction and volume of the output warning sound using a plurality of internal speakers in the inside of the vehicle.

The pedestrian warning device of a vehicle according to the embodiment of the present invention can prevent an accident between the vehicle and the pedestrian more in advance by notifying the driver of the moved position of the pedestrian by changes of the direction and volume of the output warning sound using a plurality of internal speakers in the inside of the vehicle, and by notifying the pedestrian of the position of the vehicle by changes of the direction and volume of the output warning sound using a plurality of external speakers oriented to various directions of the outside of the vehicle.

What is claimed is:

1. A pedestrian warning device of a vehicle comprising:
a pedestrian detector configured to detect a position of a pedestrian walking around a vehicle;
an in-vehicle warning sound outputter configured to output warning sounds through a plurality of internal speakers arranged at different positions in the vehicle; and
a controller configured to generate pedestrian movement information including a movement direction of the pedestrian based on the detected position of the pedestrian, determine a moved position of the pedestrian based on the generated pedestrian movement information, control an operation of the in-vehicle warning sound outputter according to the determined moved position to operate an internal speaker corresponding to the moved position of the pedestrian among the plurality of internal speakers as the pedestrian moves, and notify a driver of the moved position of the pedestrian by change of a direction of the output warning sound.

2. The pedestrian warning device according to claim 1, further comprising: an out-vehicle warning sound outputter configured to output warning sounds through a plurality of external speakers oriented to various directions of the outside of the vehicle,
wherein the controller comprises operating an external speaker corresponding to the moved position of the pedestrian among the plurality of external speakers according to the determined moved position and notifying the pedestrian of a position of the vehicle by change of a direction of the output warning sound.

3. The pedestrian warning device according to claim 1, wherein the controller notifies the pedestrian of the position of the vehicle by change of a volume of the output warning sound when operating the external speaker corresponding to the moved position of the pedestrian among the plurality of external speakers as the pedestrian moves.

4. The pedestrian warning device according to claim 1, wherein the controller notifies the driver of the moved position of the pedestrian by change of a volume of the output warning sound when operating the internal speaker corresponding to the moved position of the pedestrian among the plurality of internal speakers as the pedestrian moves.

5. The pedestrian warning device according to claim 4, wherein the controller controls the volume of the output warning sound according to a distance between the pedestrian and the vehicle.

6. The pedestrian warning device of claim 1, wherein the controller changes the direction of the output warning sound in response to the moved position of the pedestrian.

7. The pedestrian warning device of claim 1, wherein the controller changes the direction of the output warning sound by controlling the operation of the internal speaker corresponding to the moved position of the pedestrian or volume of the output warning sound outputted from at least one of the plurality of internal speakers in response to the moved position of the pedestrian.

* * * * *

UNITED STATES PATENT AND TRADEMARK OFFICE
CERTIFICATE OF CORRECTION

PATENT NO. : 9,994,148 B1  
APPLICATION NO. : 15/648450  
DATED : June 12, 2018  
INVENTOR(S) : Ki-Man Kim Page 1 of 1

It is certified that error appears in the above-identified patent and that said Letters Patent is hereby corrected as shown below:

On the Title Page

Under items no. (71) and (73) the address specifically the name of the City is incorrectly listed as:
Gyeonggi-Do The correct name of the City in the address should be listed as:
Incheon Signed and Sealed this  
Twenty-sixth Day of March, 2019

Andrei Iancu  
*Director of the United States Patent and Trademark Office*